(12) United States Patent
Yang

(10) Patent No.: US 7,218,080 B2
(45) Date of Patent: May 15, 2007

(54) SOFT-START APPARATUS FOR POWER SUPPLIES

(75) Inventor: Ta-Yung Yang, Milpitas, CA (US)

(73) Assignee: System-General Corporation, Taipei (TW)

( * ) Notice: Subject to any disclaimer, the term of this patent is extended or adjusted under 35 U.S.C. 154(b) by 0 days.

(21) Appl. No.: 11/224,002

(22) Filed: Sep. 13, 2005

(65) Prior Publication Data

US 2007/0057649 A1    Mar. 15, 2007

(51) Int. Cl.
*G05F 1/00*    (2006.01)
*G05F 1/573*    (2006.01)

(52) U.S. Cl. .................. 323/222; 323/282; 323/284

(58) Field of Classification Search ............. 323/222, 323/282, 284, 285
See application file for complete search history.

(56) References Cited

U.S. PATENT DOCUMENTS

| | | | | |
|---|---|---|---|---|
| 4,605,997 | A | * | 8/1986 | Kirk ........................... 363/16 |
| 6,177,783 | B1 | * | 1/2001 | Donohue ................... 323/272 |
| 6,936,997 | B2 | * | 8/2005 | Mullett ...................... 323/222 |

* cited by examiner

*Primary Examiner*—Bao Q. Vu
(74) *Attorney, Agent, or Firm*—Rosenberg, Klein & Lee

(57) ABSTRACT

A soft-start apparatus for a power supply outputs a compensation signal to a PWM controller as the power supply starts up. Meanwhile, a pulse width of a switching signal outputted from the PWM controller gradually increases from an initial value to a determined value. The pulse width of the switching signal is then timely modulated in response to the load conditions thereat so as to prevent a power switch from over-voltage and over-current damage as the power supply starts up.

16 Claims, 5 Drawing Sheets

SOFT-START APPARATUS FOR POWER SUPPLIES

BACKGROUND OF THE INVENTION

1. Field of the Invention

The present invention relates generally to a soft-start apparatus for a power supply and, more particularly to a soft-start apparatus featuring an increasing pulse width of a pulse width modulation (PWM) signal as the power supply starts up.

2. Description of Related Art

Various power supplies have been widely used to provide a regulated output voltage. FIG. 1 illustrates a block diagram of a traditional power supply comprising a switching circuit 30, a switching controller 10, an output inductor L, an output capacitor $C_1$, a voltage divider formed by resistors $R_1$ and $R_2$, a compensation network formed by a resistor $R_3$ and a capacitor $C_2$. An output terminal OUT of the switching controller 10 generates a switching signal $V_{PWM}$ to control a power switch of the switching circuit 30. Therefore, an output voltage $V_O$ of the power supply can be regulated.

The switching controller 10 includes a comparator 162, an oscillator 168, a D-type flip-flop 166 and an error amplifier 160. The oscillator 168 generates a saw signal $V_{SAW}$, which determines a switching frequency of the switching signal $V_{PWM}$. A positive input of the error amplifier 160 is supplied with a reference voltage $V_{REF}$. A negative input of the error amplifier 160 is connected to a feedback terminal FB of the switching controller 10 for receiving a feedback voltage $V_{FB}$. The error amplifier 160 generates a compensation signal $V_{COM}$ in response to the reference voltage $V_{REF}$ and the feedback voltage $V_{FB}$. The comparator 162 turns off the switching signal $V_{PWM}$ via the D-type flip-flop 166 whenever the saw signal $V_{SAW}$ exceeds the compensation signal $V_{COM}$. A pulse width of the switching signal $V_{PWM}$ is then determined by the operation of the comparator 162.

Referring to FIG. 1, various waveforms at a start-up transient of the traditional power supply is illustrated in FIG. 2. Since the feedback voltage $V_{FB}$ is extremely low at the start-up transient of the traditional power supply, the error amplifier 160 outputs a high compensation voltage $V_{COM}$. This causes a wide pulse width of the switching signal $V_{PWM}$. That is to say, the switching signal $V_{PWM}$ retains a maximum pulse width when the output voltage $V_O$ is insufficient at the start-up transient of the power supply. When the time to build a normal output voltage extends, voltage and current stress of the power switch of the switching circuit 30 will inevitably increases.

SUMMARY OF THE INVENTION

The present invention proposes a soft-start apparatus for a power supply. The soft-start apparatus provides a compensation signal to a PWM controller at the start-up transient of the power supply. A pulse width of a switching signal of the PWM controller gradually increases from an initial value to a determined value. After the power supply starts up, the pulse width of the switching signal is timely modulated in response to the load conditions. This can effectively avoid over-voltage and over-current stress of a power switch at the start-up transient of the power supply.

According to the present invention, a first power source starts to charge up a start-up capacitor and to generate a reference voltage across the start-up capacitor at the start-up transient of the power supply. A voltage-regulating unit has a first input supplied with an internal reference voltage and a second input connected to the start-up capacitor. The voltage-regulating unit further has an output with open-drain or open-collector structure. Therefore, the reference voltage can be regulated within the internal reference voltage. An error amplifier has a first input connected to the start-up capacitor and the output of the voltage-regulating unit for receiving the reference voltage. The error amplifier further has a second input connected to a feedback terminal of the power supply for receiving a feedback voltage. An output of the error amplifier generates a compensation signal. A clamping diode is connected between the second input and the output of the error amplifier for clamping the compensation signal at the start-up transient of the power supply.

At the start-up transient of the power supply, the first power source starts to charge up the start-up capacitor. The reference voltage is therefore generated across the start-up capacitor. This makes the compensation signal increase in response to the increment of the reference voltage. In such a manner, the pulse width of the switching signal gradually increases from an initial value to a determined value. The soft-start function is therefore achieved by the increasing compensation signal.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings.

DETAILED DESCRIPTION OF PREFERRED EMBODIMENTS

Figure 1:
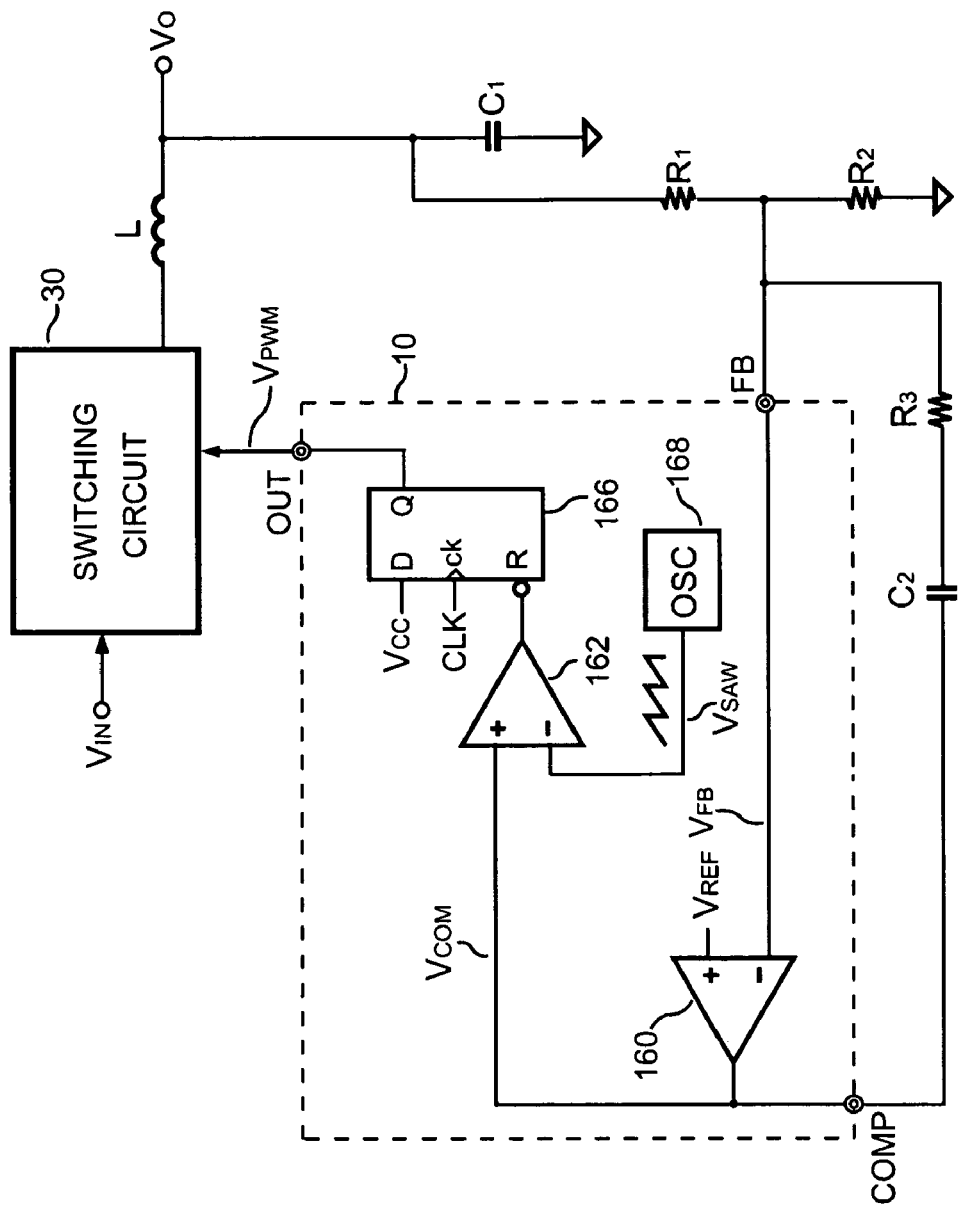
FIG. 1 shows a block diagram of a traditional power supply.
Figure 2:
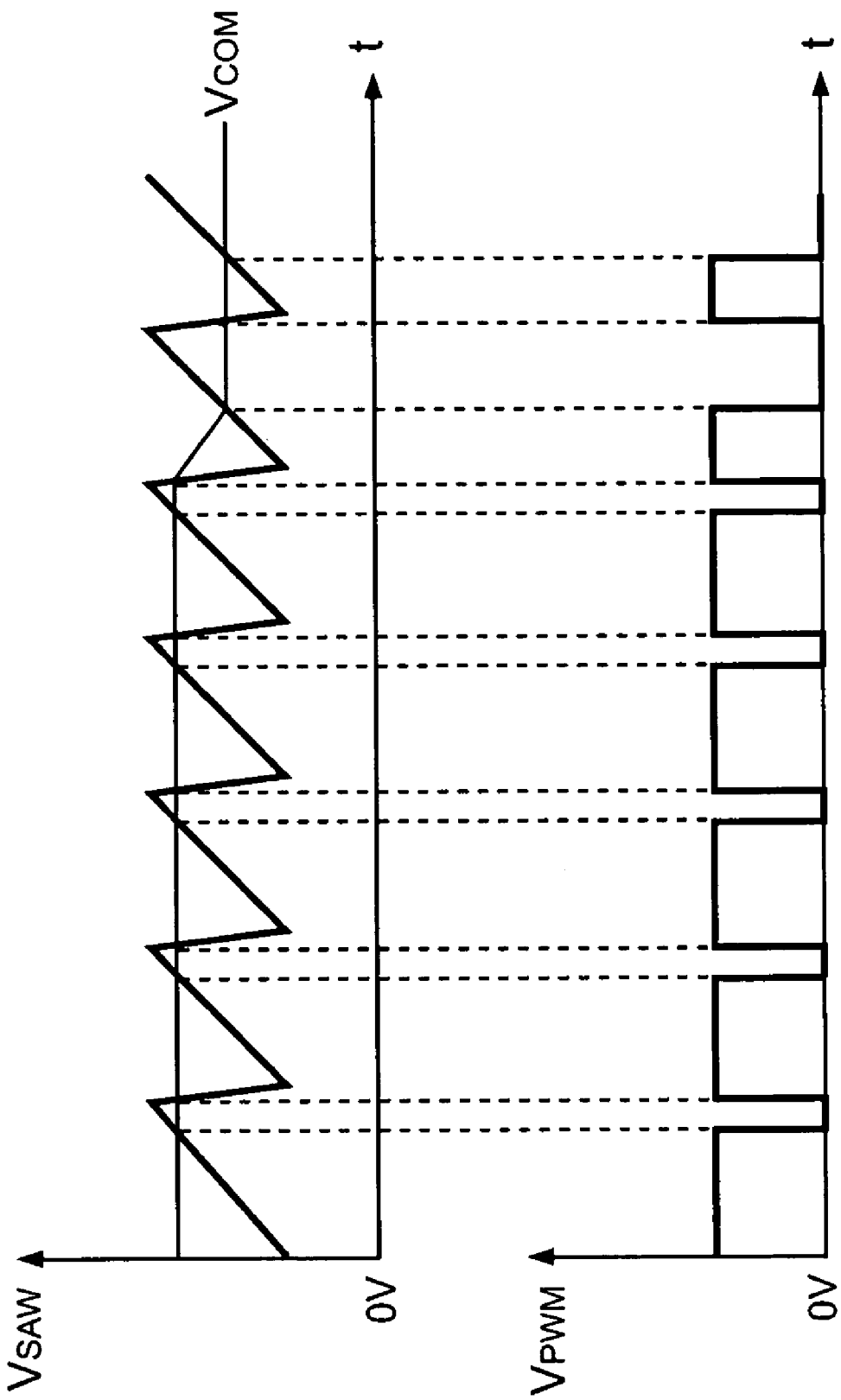
FIG. 2 shows various waveforms at a start-up transient of the traditional power supply.
Figure 3:
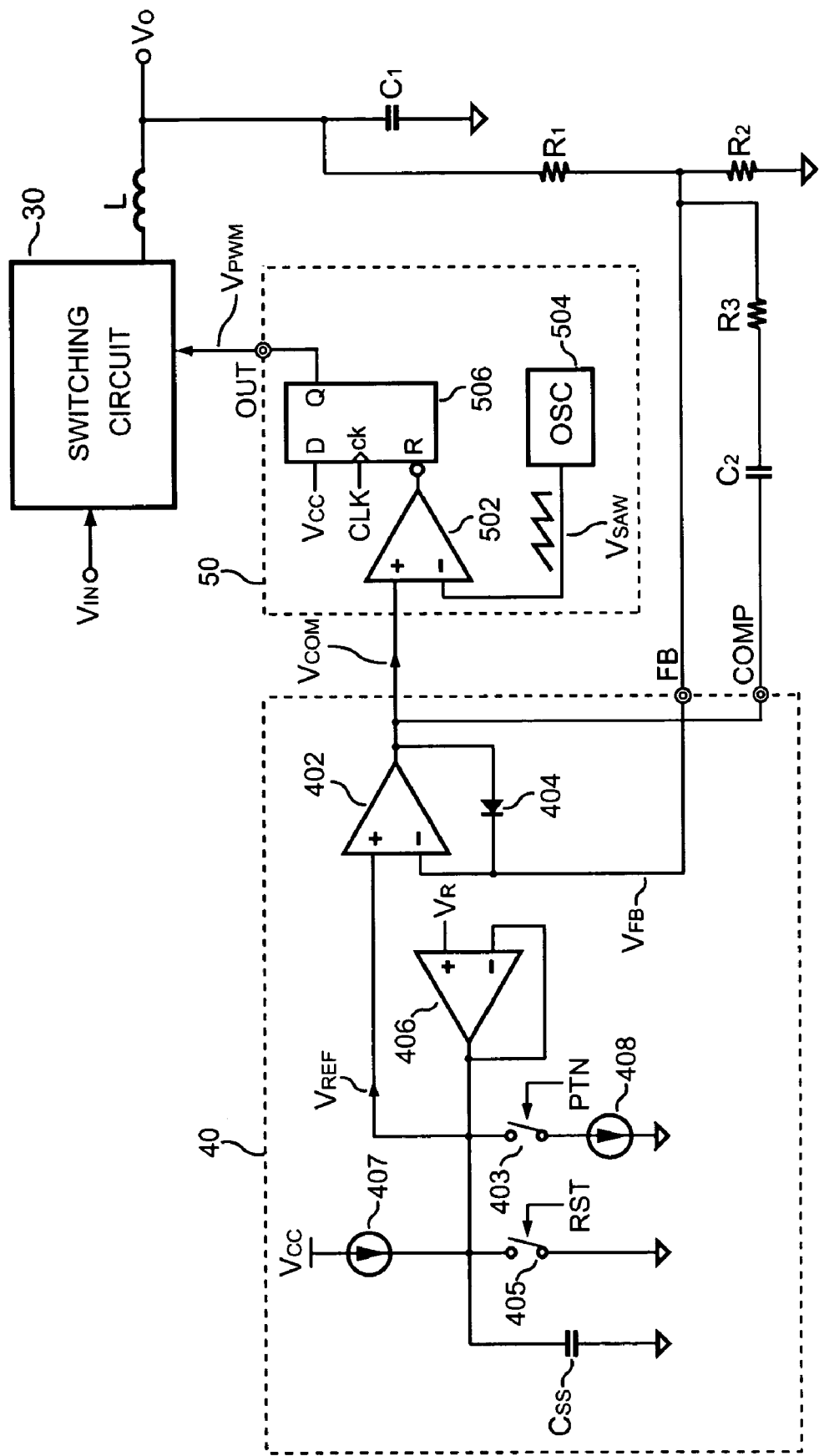
FIG. 3 shows a power supply having a start-up apparatus according to an embodiment of the present invention.

FIG. 3 shows a power supply having a soft-start apparatus 40 according to an embodiment of the present invention. The soft-start apparatus 40 connects to a PWM controller 50 and a feedback terminal FB of the power supply. A feedback voltage $V_{FB}$ at the feedback terminal FB is obtained from an output voltage $V_O$ of the power supply via a voltage divider, which is formed by resistors $R_1$ and $R_2$.

The soft-start apparatus 40 further comprises a first power source 407, a start-up capacitor $C_{SS}$, a voltage-regulating unit 406, an error amplifier 402, and a clamping diode 404. The first power source 407 is used to charge up the start-up capacitor $C_{SS}$ and to generate a reference voltage $V_{REF}$ across the start-up capacitor $C_{SS}$. The voltage-regulating unit 406 has a first input supplied with an internal reference voltage $V_R$. The voltage-regulating unit 406 further has a second input connected to its output. Such a connection forms a unit-gain buffer. The output of the voltage-regulating unit 406 further connects to the start-up capacitor $C_{SS}$. The voltage-regulating unit 406 has an output with open-drain or open-collector structure. Therefore, the reference voltage across the start-up capacitor $C_{SS}$ is regulated within the internal reference voltage $V_R$.

A first input of the error amplifier 402 connects to the start-up capacitor $C_{SS}$ and the output of the voltage-regulating unit 406. A second input of the error amplifier 402 connects to the feedback terminal FB of the power supply. The error amplifier 402 amplifies a difference between the reference voltage $V_{REF}$ and the feedback voltage $V_{FB}$ to generate a compensation signal $V_{COM}$. The compensation signal $V_{COM}$ is supplied to the PWM controller 50 via the output of the voltage-regulating unit 406. The clamping diode 404 is connected between the second input and the output of the error amplifier 402 for clamping the compensation signal $V_{COM}$ at a forward voltage drop $V_F$ of the clamping diode 404 as soon as the power supply starts up.

As described above, the reference voltage $V_{REF}$ across the start-up capacitor $C_{SS}$ starts to increase when the power supply starts up. A maximum value of the reference voltage $V_{REF}$ is equal to the internal reference voltage $V_R$. At the start-up transient of the power supply, the feedback voltage $V_{FB}$ and the reference voltage $V_{REF}$ are both zero. Since being clamped by the clamping diode 404, the error amplifier 402 outputs the compensation signal $V_{COM}$ at the start-up transient of the power supply with a voltage level equal to the forward voltage drop $V_F$ of the clamping diode 404.

Once the clamping diode 404 is removed from the second input and the output of the error amplifier 402, a soft-start function of the power supply will not take effect anymore. That is, at the start-up transient of the power supply, the feedback voltage $V_{FB}$ supplied to the second input of the error amplifier 402 will be soon amplified. The error amplifier 402 will output the compensation voltage $V_{COM}$ to the PWM controller 50 with a saturated level, such as a supply voltage of the error amplifier 402.

Referring to FIG. 3, the start-up capacitor $C_{SS}$ is charged up by the first power source 407. A start-up period of the power supply can be determined by a capacitance of the start-up capacitor $C_{SS}$. As a higher capacitance of the start-up capacitor $C_{SS}$ is selected, the start-up period of the power supply extends and a power switch having lower normal voltage and current can be utilized. Therefore, by properly selecting the capacitance of the start-up capacitor $C_{SS}$, a delay of the start-up time can become acceptable.

The PWM controller 50 comprises an oscillator 504, a comparator 502, and a D-type flip-flop 506. The oscillator 504 generates a saw signal $V_{SAW}$ having an upper threshold voltage $V_{TH2}$ and a lower threshold voltage $V_{TH1}$. A positive input of the comparator 502 is connected to the output of the error amplifier 402 for receiving the compensation signal $V_{COM}$. A negative input of the comparator 502 is supplied with the saw signal $V_{SAW}$. The comparator 502 resets the D-type flip-flop 506 as the saw signal $V_{SAW}$ exceeds the compensation signal $V_{COM}$. This further determines the pulse width of the switching signal $V_{PWM}$.

Figure 4:
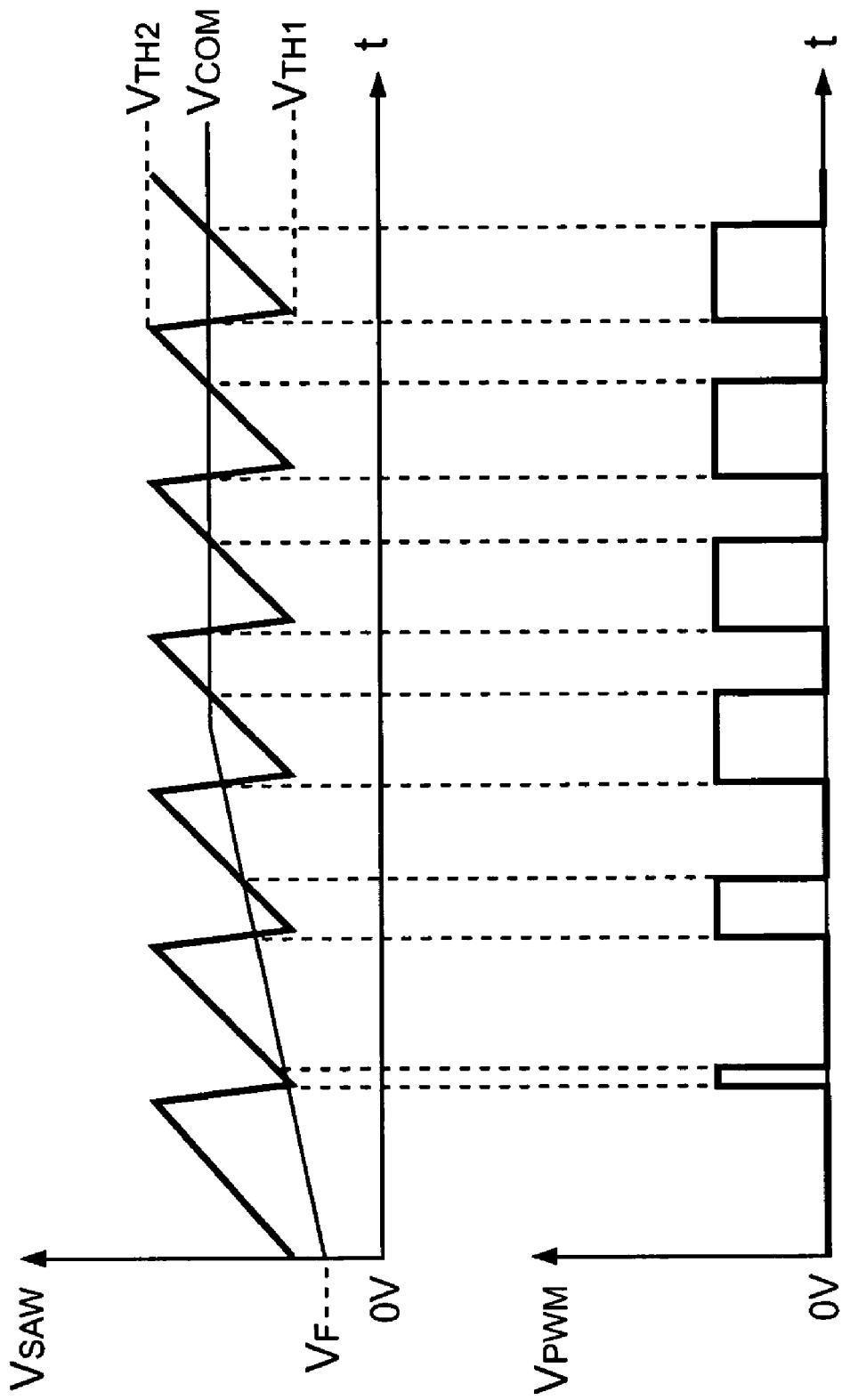
FIG. 4 shows various waveforms at a start-up transient of the power supply according to the present invention.

Referring to FIG. 3, various waveforms at the start-up transient of the power supply of the present invention is illustrated in FIG. 4. The reference voltage $V_{REF}$ across the start-up capacitor $C_{SS}$ starts to increase as the power supply starts up. Since the output of the voltage-regulating unit 406 is an open-drain or open-collector structure, the maximum value of the reference voltage $V_{REF}$ will be equal to the internal reference voltage $V_R$. As the voltage at the first input of the error amplifier 402 is zero, the output of the error amplifier 402 is clamped at the forward voltage drop $V_F$ of the clamping diode 404, such as 0.7 volts. However, the forward voltage drop $V_F$ of the clamping diode 404 is still lower than the lower threshold voltage $V_{TH1}$. Meanwhile, the compensation signal $V_{COM}$ increases in response to an increment of the reference voltage $V_{REF}$. The pulse width of the switching signal $V_{PWM}$ starts to extend from an initial value during the start-up capacitor $C_{SS}$ is charged up. As the reference voltage $V_{REF}$ reaches the internal reference voltage $V_R$, the pulse width of the switching signal $V_{PWM}$ reaches to a determined value and is then timely modulated in response to the load conditions. This achieves soft-start operation for the power supply.

Figure 5:
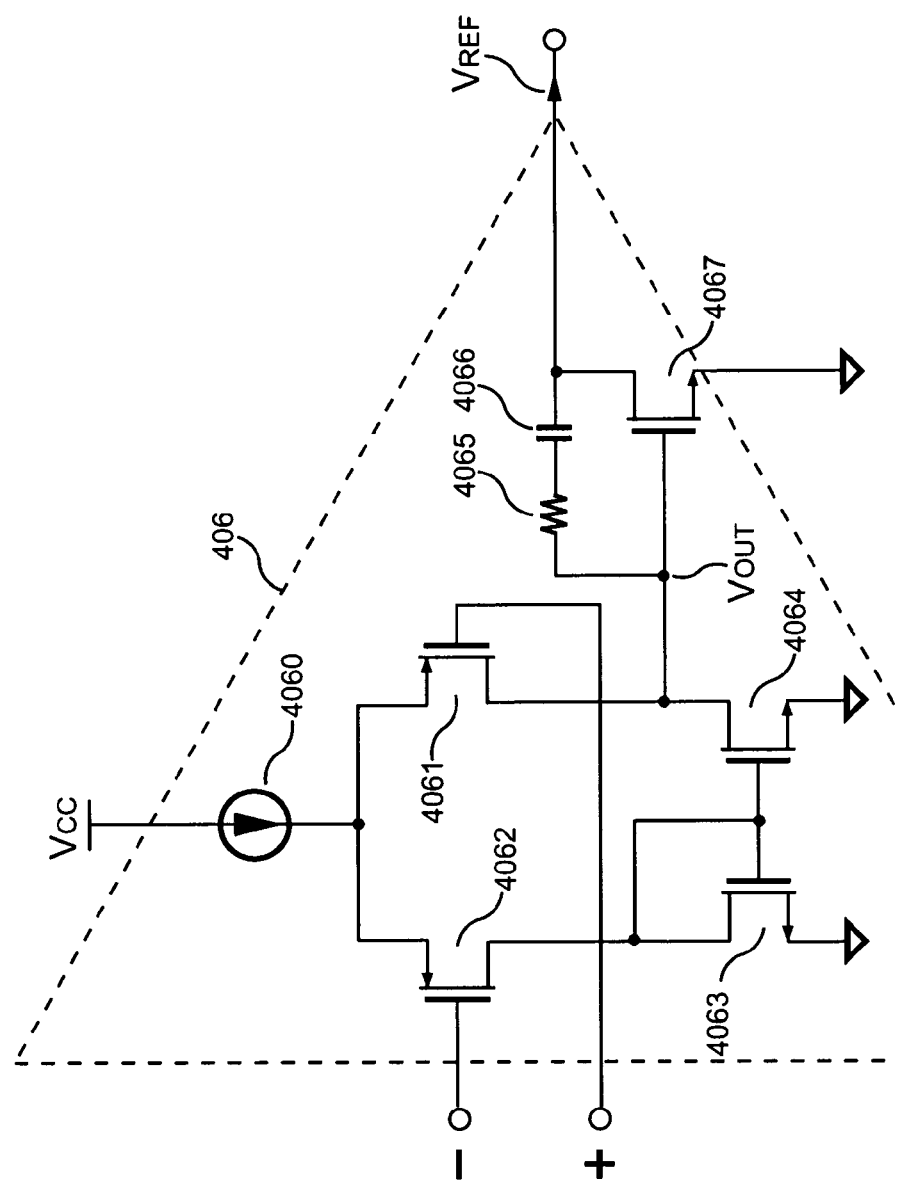
FIG. 5 shows a voltage-regulating unit of the start-up apparatus according to a preferred embodiment of the present invention.

FIG. 5 shows the voltage-regulating unit 406 according to an embodiment of the present invention. The voltage-regulating unit 406 comprises the first input, the second input, and the output for outward connection. The voltage-regulating unit 406 further comprises a differential-pair input amplifier formed by transistors 4061, 4062, 4063 and 4064, a current source 4060, a resistor 4065, a capacitor 4060, and an output transistor 4067. The differential-pair input amplifier is connected to the current source 4060. In response to a differential-pair input signal from the first and second inputs of the differential-pair input amplifier, the differential-pair input amplifier generates an output signal $V_{OUT}$, which is supplied to a gate of the output transistor 4067. A drain of the output transistor 4067 is the output of the voltage-regulating unit 406, which generates the reference voltage $V_{REF}$. The source of the output transistor 4067 is connected to a ground reference. The resistor 4065 and the capacitor 4066 are connected in series between the drain and the gate of the output transistor 4067 for frequency compensation. The drain of the output transistor 4067 is connected to the output of the voltage-regulating unit 406, which is an open-drain or open-collector output structure.

Further referring to FIG. 3, the soft-start apparatus 40 further comprises a switch 405 connected with the start-up capacitor $C_{SS}$ in parallel. As the power supply is unable to provide a normal output, a reset signal RST will be generated in response to the feedback voltage $V_{FB}$. The switch 405 is turned on by the reset signal RST to discharge the start-up capacitor $C_{SS}$ for resetting the power supply. The start-up apparatus 40 further comprises a discharge circuit formed by connecting a second power source 408 and a second switch 403 in series. The discharge circuit is connected in parallel with the start-up capacitor $C_{SS}$. As abnormal condition, such as over-power, short circuit, and over-voltage, occurs, a protection signal PTN will be generated in response to the feedback voltage $V_{FB}$ to turn on the switch 403. The protection signal PTN turns on the switch 403 to discharge the start-up capacitor $C_{SS}$. Therefore, the power supply is reset, which achieves the protection for the power supply.

As describe above, the present invention proposes a soft-start apparatus for a power supply. The soft-start apparatus generates a compensation signal to a PWM controller at the start-up transient of the power supply. A pulse width of a switching signal of the PWM controller gradually increases from an initial value to a determined value. After the power supply starts up, the pulse width of the switching signal is then timely modulated in response to the load conditions. This can effectively avoid over-voltage and over-current stress of a power switch at the start-up transient of the power supply.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. A soft-start apparatus for a power supply outputting a compensation signal to a PWM controller at a start-up transient of said power supply, comprising:
   a start-up capacitor;
   a first power source, connected to said start-up capacitor for charging up said start-up capacitor;

a voltage-regulating unit, having a first input, a second input and an output; said first input of said voltage-regulating unit being supplied with an internal reference voltage, said second input of said voltage-regulating unit being connected to said output of said voltage-regulating unit and said start-up capacitor; wherein said voltage-regulating unit is used to regulate a reference voltage across said start-up capacitor;

an error amplifier, having a first input, a second input and an output; said first input of said error amplifier being connected to said output of said voltage-regulating unit for receiving said reference voltage, said second input of said error amplifier being connected to a feedback terminal of said power supply for receiving a feedback voltage; wherein said error amplifier generates said compensation signal in response to said reference voltage and said feedback voltage; and a clamping diode, connected between said second input and said output of said error amplifier, said clamping diode being used for clamping said compensation signal at said start-up transient of said power supply.

2. The soft-start apparatus as claimed in claim 1, wherein said first power source is a current source for providing a charge current for said start-up capacitor.

3. The soft-start apparatus as claimed in claim 1, said soft-start apparatus further comprising a first switch connected with said start-up capacitor in parallel, said first switch being tuned on by a reset signal to discharge said start-up capacitor.

4. The soft-start apparatus as claimed in claim 1, said soft-start apparatus further comprising:

a second power source, providing a discharge current for said start-up capacitor;

a second switch, connected to said start-up capacitor and said second power source, said second switch being turned on by a protection signal to discharge said start-up capacitor with said discharge current.

5. The soft-start apparatus as claimed in claim 4, wherein said second power source is a current source.

6. The soft-start apparatus as claimed in claim 1, wherein an initial value of said compensation signal at said start-up transient is equal to a forward voltage drop of said clamping diode.

7. The soft-start apparatus as claimed in claim 1, said voltage-regulating unit comprising:

a differential-pair input amplifier, connected to a current source, wherein said differential-pair input amplifier receives a differential-pair input signal via said first input and said second input thereof, whereby said differential-pair input amplifier generates an output signal; and an output transistor, having a gate supplied with said output signal of said differential-pair input amplifier generating said reference voltage, said output transistor further comprising a source connected to a ground reference and a drain connected to said output of said voltage-regulating unit.

8. The soft-start apparatus as claimed in claim 7, wherein said output transistor has an open-drain structure.

9. The soft-start apparatus as claimed in claim 7, wherein said output transistor has an open-collector structure.

10. A soft-start apparatus for a power supply outputting a compensation signal to a PWM controller at a start-up transient of said power supply, comprising:

a start-up capacitor;

a current source, connected to said start-up capacitor for providing a charge current to charge up said start-up capacitor;

a first switch, connected with said start-up capacitor in parallel, said first switch being turned on by a reset signal to discharge said start-up capacitor;

a voltage-regulating unit, having a first input, a second input and an output; said first input of said voltage-regulating unit being supplied with an internal reference voltage, said second input of said voltage-regulating unit being connected to said output of said voltage-regulating unit and said start-up capacitor; wherein said voltage-regulating unit is used to regulate a reference voltage across said start-up capacitor;

an error amplifier, having a first input, a second input and an output; said first input of said error amplifier being connected to said output of said voltage-regulating unit for receiving said reference voltage, said second input of said error amplifier being connected to a feedback terminal of said power supply for receiving a feedback voltage; wherein said error amplifier generates said compensation signal in response to said reference voltage and said feedback voltage; and a clamping diode, connected between said second input and said output of said error amplifier, said clamping diode being used for clamping said compensation signal at said start-up transient of said power supply.

11. The soft-start apparatus as claimed in claim 10, said soft-start apparatus further comprising:

a second power source, providing a discharge current for said start-up capacitor;

a second switch, connected to said start-up capacitor and said second power source, said second switch being turned on by a protection signal to discharge said start-up capacitor with said discharge current.

12. The soft-start apparatus as claimed in claim 11, wherein said second power source is a current source.

13. The soft-start apparatus as claimed in claim 10, wherein an initial value of said compensation signal at said start-up transient is equal to a forward voltage drop of said clamping diode.

14. The soft-start apparatus as claimed in claim 10, said voltage-regulating unit comprising:

a differential-pair input amplifier, connected to a current source, wherein said differential-pair input amplifier receives a differential-pair input signal via said first input and said second input thereof, whereby said differential-pair input amplifier generates an output signal; and an output transistor, having a gate supplied with said output signal of said differential-pair input amplifier generating said reference voltage, said output transistor further comprising a source connected to a ground reference and a drain connected to said output of said voltage-regulating unit.

15. The soft-start apparatus as claimed in claim 14, wherein said output transistor has an open-drain structure.

16. The soft-start apparatus as claimed in claim 14, wherein said output transistor has an open-collector structure.

* * * * *